July 3, 1945. H. S. EBERHARD ET AL 2,379,628
STEERING BY DRIVING
Filed Nov. 16, 1940 7 Sheets-Sheet 1

INVENTORS
Harmon S. Eberhard
BY George W. Lewis
ATTORNEY.

July 3, 1945.  H. S. EBERHARD ET AL  2,379,628
STEERING BY DRIVING
Filed Nov. 16, 1940   7 Sheets-Sheet 5

INVENTORS
Harmon S. Eberhard
George W. Lewis
BY
ATTORNEY

Patented July 3, 1945

2,379,628

UNITED STATES PATENT OFFICE 2,379,628

STEERING BY DRIVING

Harmon S. Eberhard, Peoria, Ill., and George W. Lewis, Cedar Rapids, Iowa, assignors to Caterpillar Tractor Co., San Leandro, Calif., a corporation of California Application November 16, 1940, Serial No. 365,980

8 Claims. (Cl. 180—9.2)

Our invention relates to steering by driving, and more particularly to the steering of vehicles, such as track-type tractors, by control of the drive to the traction means of such vehicles.

In self-propelled vehicles such as track-type tractors having an endless track at each side of the machine, steering is usually effected by control of the drive to each of such endless tracks by means of releasable drive establishing means in the form of friction steering clutches. Such clutches generally comprise a driving member having spaced clutch discs or plates slidably secured thereto, and a driven member also having spaced clutch discs or plates slidably secured thereto and interposed between the clutch plates of the driving member. Spring means in combination with a pressure plate acting against such clutch plates are provided for maintaining the clutch plates in tight frictional engagement to effect engagement of the clutch, so that the driving member may drive the driven member for transmission of a drive to the traction means. For disengaging the clutch and consequently releasing such drive, control means is associated with the spring means and the pressure plate to enable the pressure plate to be moved so as to reduce the pressure on such friction plates or apply a minimum or substantially no pressure thereon.

When a minimum or substantially no pressure is applied on the clutch plates, the drive is completely released, but by applying varying degrees of pressure on such clutch plates, less than the maximum amount at which such clutch plates are maintained in tight frictional engagement, slippage of the clutch obtains enabling partial transmission of the drive depending upon the extent of pressure applied. A brake is associated with each of the traction means, which may be applied when the associated steering clutch is disengaged. By the described arrangement, the vehicle may be turned sharply in one direction or the other when either one of the steering clutches is completely disengaged and the associated brake applied; and by slipping of either one of such steering clutches, steering may be effected along a greater arc depending upon the extent of such slipping.

In large size track-type tractors, the steering clutches are generally large; and consequently the spring pressure for holding the clutch plates together when the clutches are engaged is usually great. Since disengagement of the steering clutches is effected against action of the spring means for holding the clutch plates together, it is apparent that where such spring pressure is great, it is sometimes quite burdensome for the operator to control steering of the machine, particularly under circumstances where he has to do a great deal of turning in a comparatively short time.

Our invention has as its objects, among others, the provision of improved hydraulic control mechanism in association with steering clutches of the character described, which will facilitate the work of the operator of the machine in steering the machine; enable the same type of operation that obtains with respect to manually operable mechanical mechanism, but much easier; enable manual operation of the steering clutches in case of failure of the hydraulic control mechanism or lack of hydraulic power; and which has a common pumping means therefor. Other objects of our invention will become apparent from a perusal of the following description thereof.

Referring to the drawings.

Figure 1:
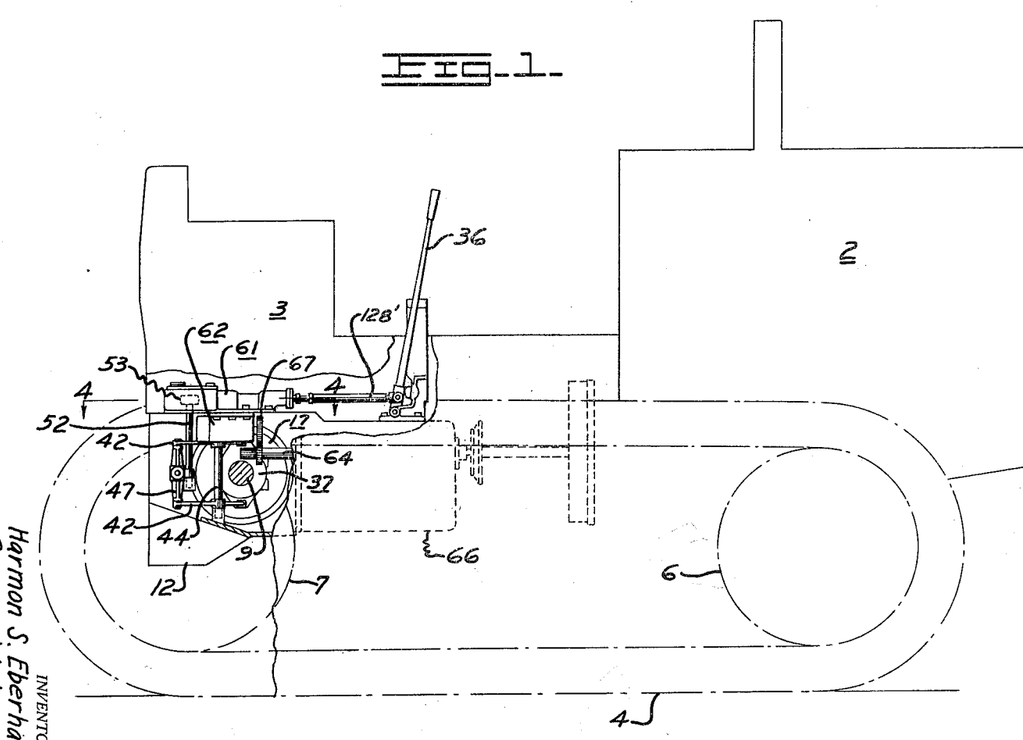
Fig. 1 is a more or less schematic side elevational view of a track-type tractor with a portion thereof broken away to illustrate the general arrangement of our hydraulic steering clutch control mechanism.
Figures 2, 3:
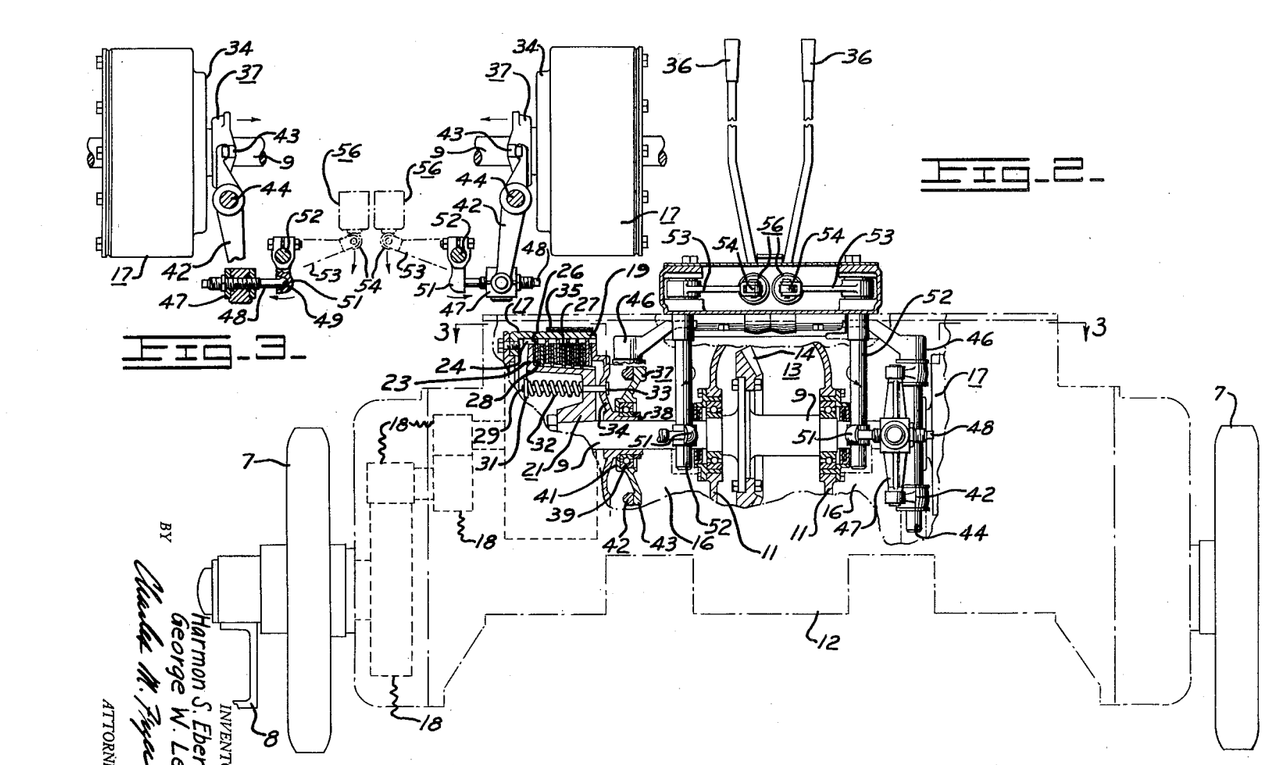
Fig. 2 is a rear elevational view of the tractor of Fig. 1, with parts shown broken away and parts omitted from the view, to illustrate the arrangement of the steering clutches.
Fig. 3 is a sectional elevation of the steering clutches, taken in a plane indicated by line 3—3 in Fig. 2.

For purposes of illustration, the mechanism of our invention is shown embodied in a track-type tractor where it is particularly adapted. However, it is equally applicable in any type of vehicle where steering is effected by control of drive establishing means to associated traction means. With reference to Figs. 1, 2 and 3, which illustrate the general arrangement of the steering clutches, such tractor comprises a tractor body including engine 2 and operator's station 3. At each side of the tractor body, is an endless track mechanism including endless track 4, front idler 6, and final drive sprocket 7 supported upon a truck frame a portion 8 of which is shown in Fig. 2. As is usual in track-type tractors, the endless track mechanisms are connected to oscillate or pivot about the axis of final drive sprockets 7; and such final drive sprockets engage the endless tracks 4 for propulsion of the machine.

Driving of final drive sprockets 7 is from cross shaft 9 journalled in spaced walls 11 in case 12, which walls 11 form a so-called wet compartment 13 containing lubricant, and also a bevel gear 14 secured to cross shaft 9 and meshing with a bevel pinion (not shown) by which the drive is transmitted from the engine to bevel gear 14 and consequently the cross shaft. At the outer side of each of walls 11 is formed a so-called dry compartment 16 which does not contain lubricant, but in which is located a friction steering clutch 17 adapted to transmit a drive from the cross shaft 9 to the associated sprocket 7 through final drive gearing 18.

The friction steering clutches may be of any suitable construction; and reference is made to Best Patent No. 1,501,740, dated July 15, 1924, as illustrating a form of multiple disc steering clutch substantially the same in principle as that disclosed herein. Each of such steering clutches comprises an outer driven drum 19 connected to final drive gearing 18, and an inner driving member 21 secured to an end of cross shaft 9 for rotation therewith and having an outer radially extending peripheral flange 23. Secured for rotation with driven drum 19 but axially slidable therein in suitable keyways 24 are spaced friction discs or plates 26; and complementary spaced friction discs or plates 27, secured for rotation with driving member 21 but axially slidable in suitable keyways 28, are interposed between the driven friction plates 26. When all of such friction plates 26 and 27 are tightly pressed together, it is apparent that each clutch will be engaged to transmit a drive therethrough from cross shaft 9 to the associated final drive gearing 18.

Spring means is provided for normally maintaining the friction plates of each clutch in tight frictional engagement so that the clutch may be engaged. The driving member 21 has a plurality of pins 29 extending axially therethrough and slidable therein. At its outer end, each pin is provided with a head 31 which provides an abutment for a spring 32 compressed between such head 31 and the outer side of driving member 21. The inner end of each pin 29 is also provided with a head 33 which provides an abutment for pressure plate 34 bearing against the friction plates at one side; while the other side of such friction plates bears against peripheral flange 23. Pressure plate 34 is journalled freely about cross shaft 9 and is axially slidable along it; and by virtue of the action of springs 32, it is apparent that it will be normally thrust outwardly so as to maintain the friction plates 26 and 27 in tight frictional engagement for establishment of the drive through the clutch. Inward movement of the pressure plate results in reduction of pressure on the friction plates; and depending upon the extent of such inward movement, the clutch may be completely disengaged, or partially disengaged to provide slippage thereof. In this connection, a brake 35, controllable by suitable control means (not shown) at operator's station 3, is associated with each driven drum 19, to brake the associated traction means when the clutch is disengaged to produce sharp turning of the vehicle.

Control mechanism is provided, actuatable through manually manipulatable steering clutch control levers 36 at the operator's station 3, for moving each of pressure plates 34 inwardly against the action of springs 32. Such control mechanism comprises a collar 37 journalled about the hub 38 of each pressure plate 34 through a suitable bearing 39, and which engages a side of such bearing by means of an outer flange 41 so as to effect inward movement of the pressure plate when the collar is moved inwardly. Inward movement of collar 37 is effected by means of levers 42 which engage at one end lugs 43 formed on the periphery of collar 37 and which are pivoted intermediate their ends on an upright shaft 44 secured in brackets 46 fixed to case 12. At the ends opposite those which engage lugs 43, levers 42 are connected through an upright connecting member 47 which has a pin 48 adjustably secured therein. The inner end of each pin 48 is formed with a ball head 49 engaging in complementary shaped socket 51 secured to the lower end of rotatably mounted upright shaft 52; the upper end of such shaft having connected thereto a lever 53 which at its inner end is provided with a roller 54 engaging actuating mechanism 56 in which the hydraulic control mechanism of my invention is interposed, and which is adapted to be moved rearwardly by the associated steering clutch control lever 36. The direction arrows in Figs. 2 and 3 illustrate how the described disengagement of the steering clutches is effected by movement of the steering clutch control levers.

When such actuating mechanism 56 is solely a mechanical linkage connection from each lever 53 to the associated clutch control lever 36, it is apparent that if clutch springs 32 exert comparatively high pressure on the clutch plates, as is the case in large size tractors, much effort is required on the part of the operator in hand manipulating the clutches against the action of such springs. As was previously mentioned, our invention is designed to obviate this difficulty by the employment of hydraulic control mechanism which provides power operable means for controlling the clutches. Such power operable hydraulic mechanism is controllable through control levers 36, and is designed to provide substantially the same action on the steering clutches as would obtain by hand manipulation of the steering clutches, except much easier.

With reference to Figs. 4 through 8, the power operable hydraulic control mechanism includes common pumping means for a plurality of actuating means, to provide for simplicity of construction. It is contained in a valve housing 61 attached to the top of case 12 and a pump housing 62 projecting through aperture 63 in the top of case 12 and secured to the underside of valve housing 61. A single pump 62' in pump housing 62 is driven from engine 2 through transmission shaft 64 extending from the speed change transmission 66 and which rotates continuously while the engine is running and the master clutch is engaged; such shaft 64 being connected to rotate gear 67 secured to pump driving shaft 68 journalled in and extending into pump housing 62. If so desired, pump 62' may be driven continuously even when the master clutch is disengaged by providing a direct connection thereof with the engine ahead of the master clutch.

The pump 62' in pump housing 62 may be of any suitable construction capable of maintaining a suitable pressure flow of fluid, such as oil, through valve housing 61. We preferably employ a substantially constant volumetric discharge rotary gear pump which comprises driving gear 69 integral with shaft 71 which is secured by collar 72 to driving shaft 68. Gear 69 is located in pump compartment 73 formed in a cap 74 detachably secured by means of cap screws 76 to a vertical wall 77 of pump housing 62. A driven pump gear 79 meshes with driving pump gear 69; and both of such gears are enclosed by block 81 held against vertical wall 77 by bearing cap 82 secured by cap screws 83; such bearing cap 82 providing journal means for a stub shaft 84 forming an integral part of each of gears 69 and 79 at one side thereof; while at the opposite side of such gears, vertical wall 77 provides journal means for a stub shaft 85 of gear 79 and shaft 71 of gear 69. Pump gears 69 and 79 are thus enclosed in a fluid tight compartment 86 into which a suitable hydraulic medium, such as oil, is drawn and from which such medium is discharged, by rotation of the gears.

Oil is contained in a reservoir 87 in pump housing 62 and is sucked into pump compartment 86 through passage 88 in vertical wall 77, filter element 89 in wall 77, upright passage 91 also in wall 77, and port 92 communicating with passage 91 and with the suction side of the pump gears 69 and 79. The oil under pressure from the discharge side of the pump gears, is discharged through port 93 in wall 77 and which communicates with upright discharge passage 94 extending through wall 77 and from pump housing 62 into valve housing 61; the junction between valve housing 61 and pump housing 62 being leak proofed by means of gasket 96, and by a packing sleeve 97 within the adjacent portions of passage 94 at such junction. The oil under pressure effected by the pump 62' flows through valve housing 61 in a manner to be subsequently described; and from such valve housing, it flows back into reservoir 87 through cooperating apertures 98 formed in the adjacent walls of valve housing 61 and pump housing 62. Thus, the pump maintains a continuous flow of oil under substantially constant pressure. For replenishing the supply of oil from time to time when needed, we provide a filler spout 99 in the top wall of valve housing 61, and which communicates with filter element 101 in valve housing 61. From filter element 101, the oil can flow into reservoir 87 through the apertures 98.

Figure 4:
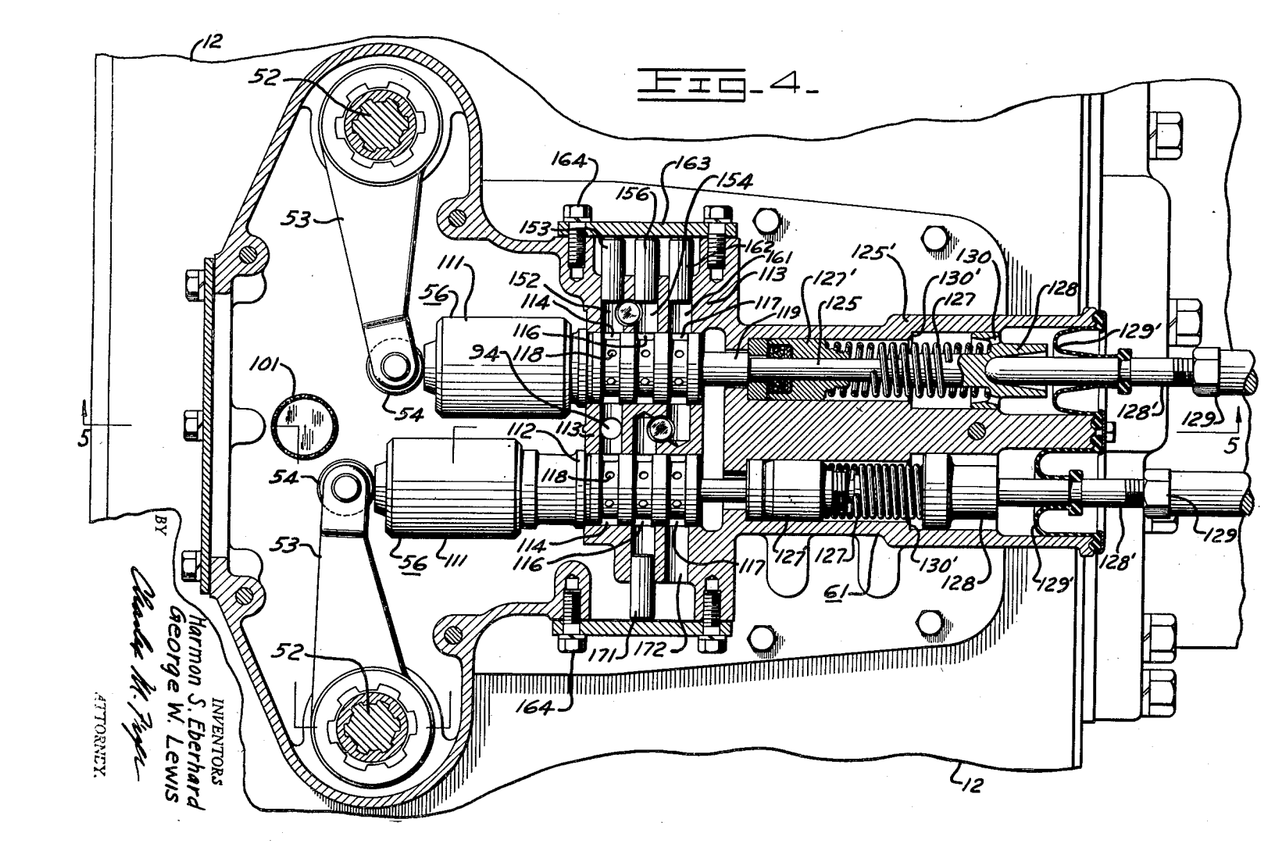
Fig. 4 is a horizontal sectional view of the hydraulic control mechanism, taken in a plane indicated by line 4—4 in Fig. 1.
Figure 5:
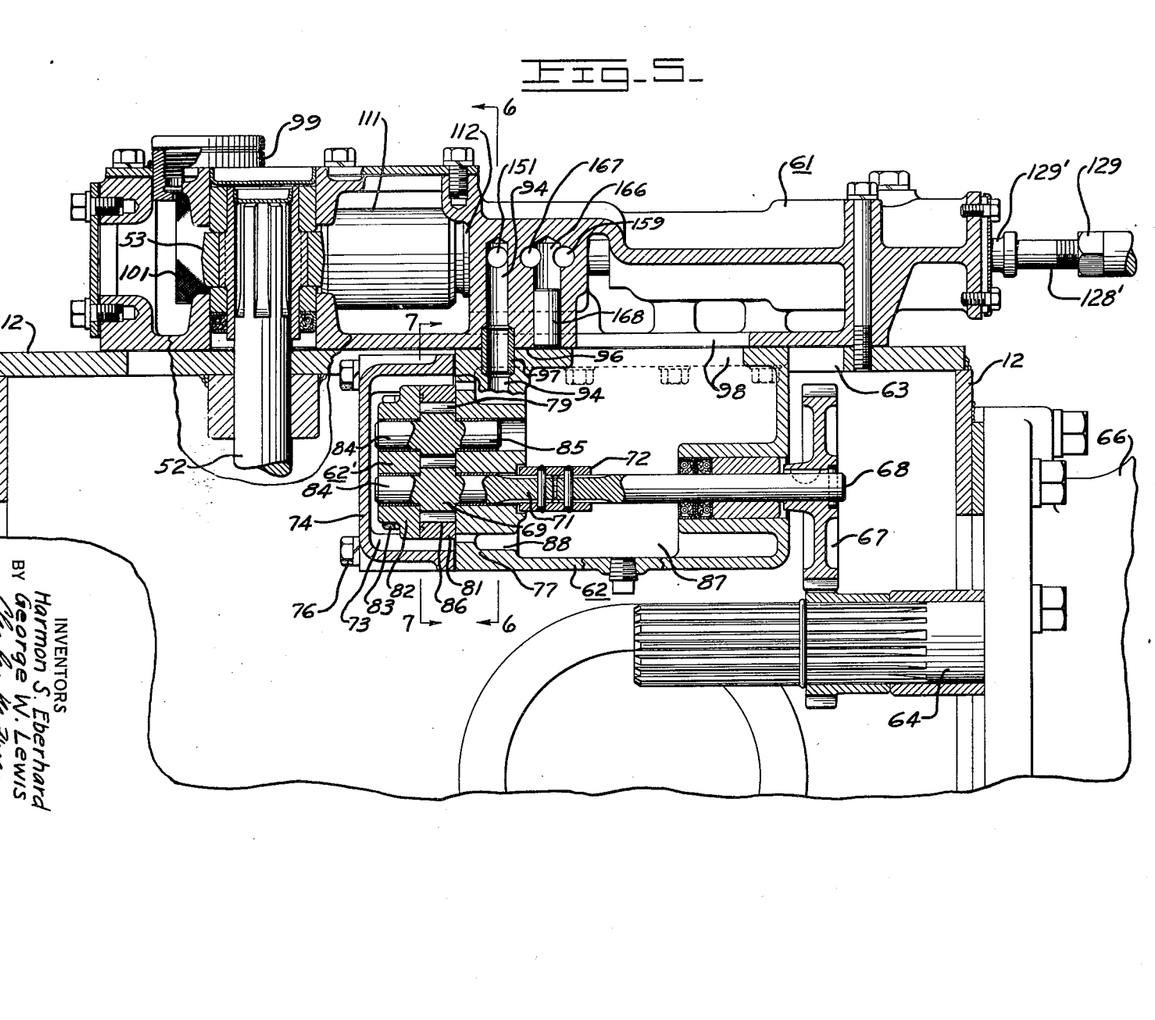
Fig. 5 is a vertical sectional view of the hydraulic control mechanism taken in planes indicated by line 5—5 in Fig. 4.

A plurality of control valves, each associated with an actuating piston, are provided in valve housing 61 to control the flow of oil pumped by the common pump 62', and actuate levers 53 against the load of clutch springs 32. As is illustrated in Fig. 4, such levers 53, which are connected to upright shafts 52, are enclosed in valve housing 61; and the rollers 54 thereon engage substantially cup-shaped actuating pistons 111, the movements of which are controlled through the associated valve mechanism. The hydraulic control and actuating means associated with each steering clutch is the same; hence, in the subsequent description of such means, reference will be made primarily to only one of them.

Figure 6:
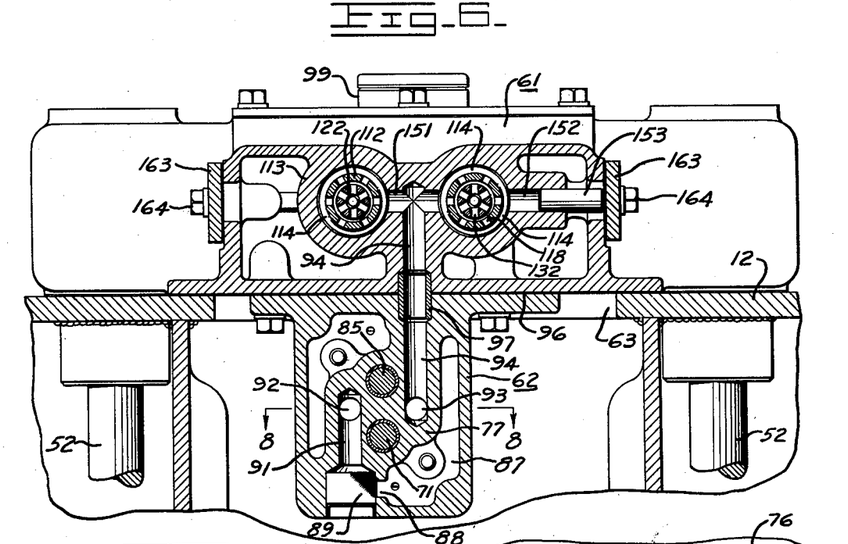
Fig. 6 is a transverse sectional view taken in a plane indicated by line 6—6 in Fig. 5.
Figure 7:
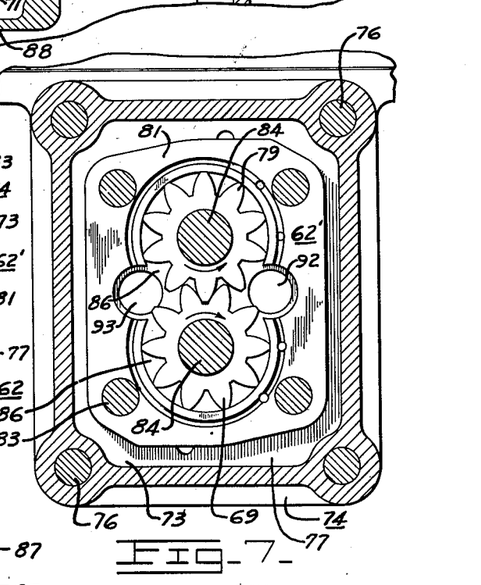
Fig. 7 is a transverse sectional view taken in a plane indicated by line 7—7 in Fig. 5.
Figure 8:
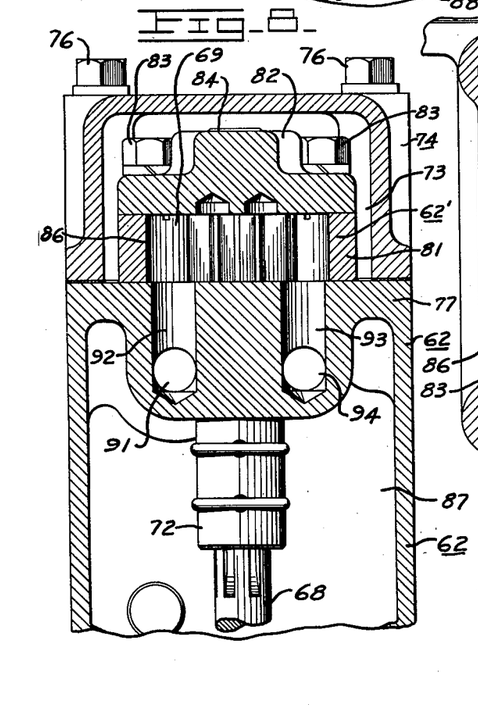
Fig. 8 is a horizontal sectional view taken in a plane indicated by line 8—8 in Fig. 6.
Figure 9:
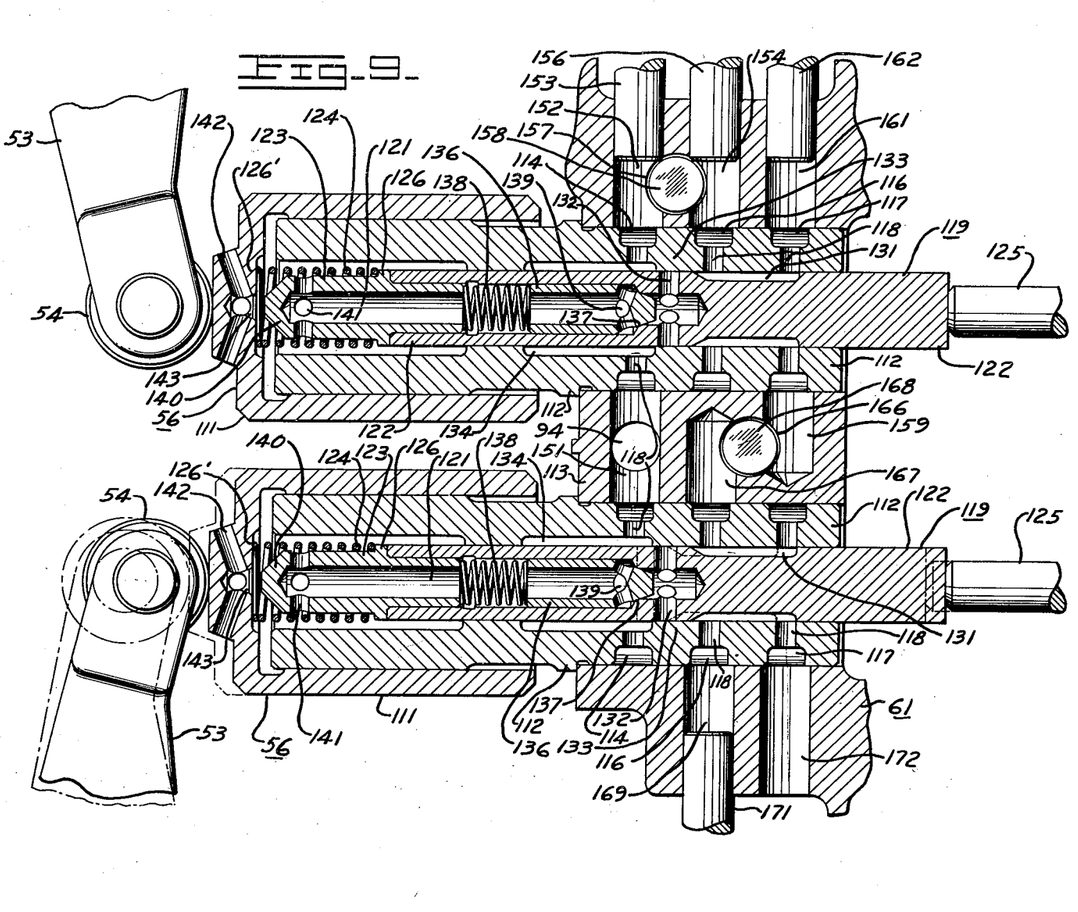
Fig. 9 is an enlarged fragmentary horizontal sectional view of the valve control mechanism forming part of the hydraulic control mechanism appearing in Fig. 4; the parts in Fig. 9 being illustrated in neutral position.

With reference to Figs. 4, 6 and 9, the hydraulic power control mechanism is mounted in stationary body means which includes a pair of stationary hollow sleeves 112 press fitted in wall 113 of valve housing 61. Each of these sleeves is provided with a rear annular groove 114, an intermediate annular groove 116 and a front annular groove 117, all of which communicate with the interior of such sleeve through radially extending ports or apertures 118. The rear end of each sleeve 112 projects beyond wall 113; and it is upon such projecting end that piston 111 is adapted to slide axially. Valve control mechanism is axially slidable within each of stationary sleeves 112 comprising a hollow valve member 119 having interior passage 121 formed in its rear end. For convenience in manufacture, such valve member 119 is made of a front part 122 removably press-fitted on rear part 123; and it is adapted to be thrust forwardly by means of spring 124 interposed between shoulder 126 on valve member 119 and the inside of the rear end 126' of movable piston 111. The steering clutch springs 32 in each clutch serve to thrust the associated lever 53 forwardly, and exert greater pressure than spring 124.

As a result, when the associated clutch is engaged, piston 111 provides an abutment for spring 124, and valve member 119 is thrust forwardly by such spring 124 against a rod 125 slidably mounted in a boss 125' formed integral with valve housing 61. Rod 125 is thrust forwardly by a spring 127 interposed between packing gland 127' and socket member 128 formed at the forward end of such rod 125. Such socket member 128 engages linkage 128' which is adjustable as to length at 129, and which is pivotally connected to an associated clutch control lever 36. A suitable flexible sealing boot 129' is provided between linkage 128' and boss 125'; while socket member 128 is formed with suitable bleed apertures 130. Rearward movement of rod 125 is limited to the proper extent by means of a stop 130' formed as a shoulder within boss 125' and which is adapted to be engaged by the rear end of socket member 128.

The described connection between a lever 53 and an associated manually manipulatable clutch control lever 36, including linkage 128', rod 125, valve member 119 and piston 111, provides axially movable mechanical means whereby upon rearward movement of the associated clutch control lever 36, the associated steering clutch may be disengaged. This is so because without the action of hydraulic pressure created by the common pump 62', rearward movement of valve member 119 as effected by the associated clutch control lever 36, will cause it to bear against rear end 126' of piston 111, and consequently urge lever 53 rearwardly against the action of the associated steering clutch springs 32. In this connection, the piston 111 and associated valve member form part of the hydraulic actuating means as will be more fully described hereinafter; and since these elements are adapted to provide part of solely manually controllable clutch disengaging mechanism, it is seen that the hydraulic actuating mechanism embodies means enabling manual control of the clutches upon lack or failure of hydraulic power, which is an important feature of our invention.

Adjacent the solid forward portion of valve member 119 is formed an elongated peripheral groove 131 which in the neutral position of the hydraulic control mechanism i. e., when the associated steering clutch is completely engaged, communicates with the apertures 118 communicating with intermediate groove 116 and front groove 117 in stationary sleeve 112. At the rear of such groove 131 and communicating with interior passage 121 of valve member 119 are a plurality of radially extending apertures or ports 132 which in the neutral position of valve member 119 are closed by the portion 133 of stationary sleeve 112, intermediate rear groove 114 intermediate groove 116. However, when valve member 119 is moved rearwardly to disengage the associated steering clutch, apertures 132 communicate with an annular groove 134 formed in the inner wall of stationary sleeve 112, and which in turn communicates with rear groove 114 through the associated apertures 118. Thus, apertures 132 form inlet ports for flow of fluid into valve member 119.

A spring pressed hollow check valve 136, the function of which will be subsequently described, is mounted within valve member 119 in passage 121, and is adapted to seat against a shoulder 137 formed rearwardly of but adjacent inlet ports 132. A spring 138 bearing against such check valve 136, is adapted to maintain the valve closed, but upon flow of fluid under pressure through inlet ports 132, the valve will become unseated against the action of spring 138, and fluid will flow into passage 121 through substantially radially extending ports 139 formed in the check valve rearwardly of its seat. The rear end 140 of valve member 119 is closed, but adjacent such end are formed radially extending discharge ports 141 to allow fluid under pressure to escape from valve passage 121 and act against the rear end wall 126 of piston 111, past which such fluid can escape through bleed apertures or ports 142 formed in such piston end wall 126', and which communicate with a central port 143. End 140 of valve member 119 is tapered and the wall of aperture 143 has a complementary taper whereby upon rearward movement of valve member 119, end 140 serves as a valve tending to close port 143. The function of discharge ports 141 in valve member 119, bleed ports 142 in piston 111, and the relationship of port 143 with respect to ports 141 and valve end 140, will be subsequently explained.

Wall 113 is provided with passages, which in cooperation with grooves 114, 116 and 117, and apertures 118, form a continuous passageway in the body means including sleeves 112 and wall 113, for flow of oil therethrough. Such passages include passage 151 between sleeves 112, and which communicates with passage 94 through which fluid is discharged by pump 62', and also with the rear grooves 114 in sleeves 112. Adjacent the left side of the left hand sleeve 112 and communicating with rear groove 114 in such left hand sleeve 112 is a second passage 152 which in manufacture is drilled in line with passage 151 and is subsequently sealed at its outer end by plug 153. Adjacent passage 152 and in front thereof is an intermediate passage 154 communicating with intermediate groove 116 in the left hand sleeve 112; such passage 154 being sealed at its outer end by sealing plug 156. Communication is provided between passages 152 and 154 by an aperture 157 which may be conveniently formed by drilling through the underside of wall 113 at the proper location and subsequently sealing the lower end of such aperture 157 by sealing plug 158.

In effect, passages 152 and 154, and aperture 157 form a single passage establishing communication at the left side of grooves 114 and 116 in the left hand sleeve 112. Between sleeves 112 and communicating with front groove 117 of left hand sleeve 112 is a passage 159 which is conveniently formed by drilling during which is formed a dummy passage 161 subsequently sealed by plug 162. Plugs 153, 156 and 162 are held sealed by plate 163 secured to the left side of valve housing 61 by cap screws 164. Passage 159 communicates through an aperture 166 formed similar to aperture 157, with a passage 167 which in turn communicates with the intermediate groove 116 in the right hand sleeve 112; aperture 166 being sealed by sealing plug 168. Thus, passage 159, aperture 166 and passage 167 form a single passage establishing communication between the front groove 117 of left hand sleeve 112 and the intermediate groove 116 in right hand sleeve 112. Passage 167 may be conveniently formed by drilling; and in such drilling a dummy passage 169 is formed, which is subsequently sealed by sealing plug 171. At the right hand side of the right hand sleeve 112 is formed a discharge passage 172 which communicates with front groove 117 in such right hand sleeve and with reservoir 87 in valve housing 61.

In operation, when the tractor is moving and both steering clutches are fully engaged so that the tractor will travel straight ahead, the clutch springs 32, valve member springs 124 and check valve springs 138 will cause the parts of the hydraulic control mechanism to assume the neutral position illustrated in Fig. 9. As previously explained, pump 62' will continuously pump fluid under pressure; but, in such neutral position, the pumped fluid has no effect on actuating pistons 111 because it is bled back into pump reservoir 87 after passage through the valve housing 61 in the following manner. From inlet passage 94, fluid fills passage 151, the rear grooves 114 in sleeves 112, apertures 118 communicating with such grooves, and also annular grooves 134 formed in the inner walls of sleeves 112. In such neutral position of the parts, escape of fluid is blocked at the right hand side of passage 151.

From rear groove 114 in left hand sleeve 112, fluid fills and flows through the passage formed by the passage 152, aperture 157 and passage 154; intermediate groove 116 in left hand sleeve 112 and the associated apertures 118; and annular groove 131 in left hand valve member 119. Fluid can not escape through dummy passage 161 because it is blocked by plug 162, as was previously explained. Next, fluid flows from groove 131 in left hand valve member 119 through apertures 118 associated with front groove 117 in the left hand sleeve 112, and fills the passage formed by passage 159, aperture 166 and passage 167. From passage 167, fluid flows around and fills intermediate groove 116 in right hand sleeve 112, and flows through the associated apertures 118 to fill groove 131 in the right hand valve member 119. Fluid flowing into passage 169 can not escape because such passage is plugged by plug 171, as was previously related. From groove 131 in right hand valve member 119, fluid flows out through discharge passage 172 into the valve housing from which it flows through the cooperating apertures 98 in the valve housing and in the pump housing, into pump housing reservoir 87 from which it is recirculated by pump 62'.

From the preceding, it is seen that in the neutral position of the parts, the fluid pumped continuously through the described tortuous passageway in the stationary body means formed by sleeves 112 and wall 113, is bled back into the pump housing. Consequently, no pressure can be exerted on actuating pistons 111 to actuate them against the load of clutch springs 32 and the clutches will remain engaged. In order to have the pressure of the pumped fluid actuate either or both of pistons 111 to disengage the clutches, it is necessary that escape of fluid back into the pump housing be blocked. This is accomplished by movement of either one or both of valve members 119 rearwardly from their neutral positions, and which when so moved close one portion of the passageway for flow of fluid through the body means and establish communication of inlet ports 132 with another portion of such passageway.

For example, to initiate disengagement of the right hand steering clutch and have it remain disengaged with only a slight degree of slippage so that the tractor will turn to the right along a big arc when it, for example, is traveling on level ground or uphill, the right hand valve member 119 must be moved rearwardly through the associated clutch control lever 36 to the position where it just shuts off the apertures 118 communicating with front groove 117 in right hand sleeve 112 so as to shut off passage 172 and block escape of fluid back into the pump housing. In this connection, during the described rearward movement of the right hand valve member 119, end 140 of such valve member serves as a valve which reduces the effective area of the annular passage formed between port 143 and end 140. Inlet ports 132 in such right hand valve member 119 are so spaced that in the related position, they communicate with groove 134 in right hand sleeve 112. In Fig. 9, we have shown in phantom lines the position which some of the parts assume when right hand valve member 119 is moved just to shut off discharge passage 172 and uncover inlet ports 132 in such right hand valve member.

In such position, fluid will flow from passage 94 around right hand valve member 119, in the manner previously described, but even though passage 172 is shut off, pressure of fluid will not act against left hand piston 111 because the inlet ports 132 in left hand valve member 119 are not uncovered. However, since inlet ports 132 in right hand valve member 119 are uncovered, pressure of fluid flowing through passage 94 will act to move right hand piston 111 in the following manner. From passage 94, fluid will flow through passage 151 around rear groove 114 in right hand sleeve 112, through the associated apertures 118 and into annular groove 134 in right hand sleeve 112. From such annular groove 134, fluid flows through inlet ports 132 in right hand valve member 119, which ports have been uncovered in the manner already related. As a result, the pressure of the fluid will act against check valve 136 to effect unseating of check valve 136 against the action of spring 138.

Fluid flowing past unseated right hand check valve 136 passes through ports 139 in such valve, continues its flow through passage 121 in right hand valve member 119 and escapes out through discharge ports 141 to act against the rear end 126' of right hand piston 111 to thrust it rearwardly against the load of clutch springs 32 by virtue of the pressure which is built up against right hand piston 111 from rearward movement of valve member end 140 which results in reduction of the effective area of port 143. In this connection, fluid will escape back into valve housing 61 through piston bleed port 143; and hence when rearward movement of valve member 119 is stopped in the described position, further rearward movement of piston member 111 will also cease by virtue of such bleeding. However, the piston will remain in a relatively stationary position against the clutch spring load because port 143 and valve member end 140, the clutch spring load, and the pump pressure, are all so correlated as to provide an escape passage through port 143 which bleeds less pressure than that created by the pump.

Figure 10:
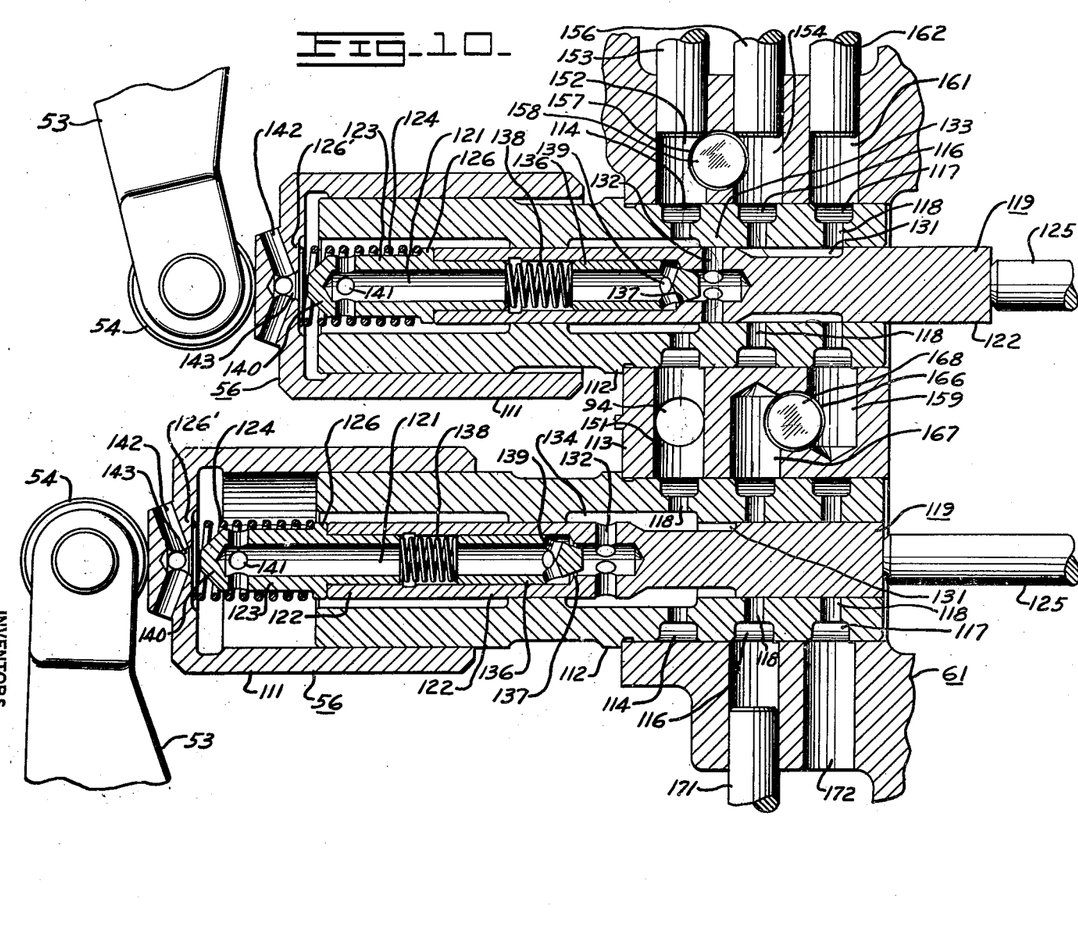
Fig. 10 is a view similar to Fig. 9 illustrating one of the valve control members in a position where the associated steering clutch is partially disengaged.

Now, should right hand valve member 119 be moved further to the rear from the phantom line position shown in Fig. 9, by further rearward movement of the associated clutch control lever 36, the rear end 140 of such valve member gradiently reduces further the effective area of the annular passage between the wall of port 143 and end 140. This causes gradiently less pressure to bleed out through such piston port 143; and the pressure builds up within piston 111 to actuate it rearwardly against the associated clutch springs 32 and effect further disengagement of the clutch against the increasing load offered by such clutch springs as they become gradiently compressed. The increasing load offered by the clutch springs as they become compressed always balances the increasing pressure built up against piston 111 by virtue of the decreasing effective area through port 143. Hence, when such further rearward movement of the associated clutch control lever 36 is terminated, piston 111 will assume a substantially stationary position against the load of the associated clutch springs 32, and the clutch will remain disengaged, to an extent which is determined by the extent of movement of the associated clutch control lever 36. In Fig. 10, the right hand clutch control mechanism is shown substantially fully disengaged. The fully disengaged position of the clutch is determined by stop 130'.

From the preceding, it is seen that the valve member 119 and its discharge ports in cooperation with the bleed ports 142 in piston 111, provide means in the hydraulic power actuating mechanism, enabling complete disengagement of the associated steering clutch or any degree of partial disengagement thereof, depending on the extent of movement of the associated valve member 119 as determined by the extent of movement of the associated steering clutch control lever 36; and when such valve member 119 is moved from its neutral position, the extent of movement of the associated piston 111 will be a function of the extent of movement of the valve member. Hence, the steering clutch may be manipulated to provide all degrees of slippage thereof, or complete disengagement, in the same manner that exists with heretofore employed strictly manual controls for steering clutches, so as to enable delicate maneuvering of the vehicle. This is an important feature of the invention because if the hydraulic actuating mechanism were of the type that caused a clutch to be either fully engaged or fully disengaged with no intermediate degrees of slippage, it would be extremely difficult to make satisfactory smooth turns.

Manipulation of the left hand control mechanism is identical to that already described with respect to the right hand control mechanism, and occurs when left hand valve member 119 is moved rearwardly by the associated clutch control lever 36 to the position where inlet ports 132 in left hand valve member 119 become uncovered, and such valve member closes the apertures 118 communicating with front groove 117 in left hand sleeve 112 to block off flow of fluid back into reservoir 87. Both of the steering clutches may be simultaneously disengaged if so desired, by movement of both valve members 119 to the positions where their inlet ports 132 are uncovered to admit fluid pressure against both pistons at the same time. In this connection, the described hydraulic actuating mechanism, will enable disengagement of either one of the steering clutches to an extent greater than the other, depending upon the extent that either of control levers 36 is moved rearwardly.

Check valves 136, in cooperation with the ends 140 of valve members 119 adapted to close ports 143, perform the important function of precluding kickback of either one of clutch control levers 36 which may have been moved to a position where the associated steering clutch is disengaged or partially disengaged, when the other steering clutch control lever 36 is moved rearwardly to disengage or partially disengage the other steering clutch. Reference is made to Fig. 10 for a more detailed explanation. For example, with the right hand steering clutch substantially disengaged and the left hand steering clutch fully engaged, it will be observed that if left hand valve member 119 were moved rearwardly so as to cause disengagement of the associated steering clutch, with consequent bleeding of fluid through the left hand piston ports 142, communication would be established between the bleed ports 142 of both pistons through the previously described passageway in body means 112 and 113.

At the moment when bleeding occurred through bleed ports 142 in the left hand piston 111, fluid pressure within right hand piston 111 would momentarily become less by virtue of such communication between the sets of piston bleed ports. Without the right hand check valve 136, this would cause the load effected by the springs 32 of the associated right hand steering clutch to kick back the entire right hand mechanism including the right hand clutch control lever 36, which might result in injury to the operator's hand. However, this action can not occur because as soon as the pressure in right hand piston 111 tends to become less, the right hand check valve 136 will seat, and the clutch spring load will cause the right hand piston discharge port 143 to become closed by tapered valve end 140 to preclude further bleeding of fluid. Thus, fluid under pressure will be trapped within right hand piston 111 to preclude the kickback. As soon as the pressure in left hand piston 111 balances the pressure in right hand piston 111, then the right hand check valve 136 will reopen.

As was previously related, should leakage occur in the valve housing, or should the hydraulic power fail from any other cause, the steering clutches may be operated entirely by manual power, because under such circumstance the rear end 140 of each of valve members 119 may be moved by rearward movement of the associated steering clutch control lever 36 to abut the end wall 126' of the associated piston 111, and thereby move the associated lever 53 for disengagement of the associated steering clutch.

We claim:

1. In a vehicle having drivable traction means at each side thereof; a friction steering clutch interposed in the drive to each of said traction means to enable steering of said vehicle by control thereof; and hydraulic mechanism for controlling said steering clutches including a manually manipulatable control member associated with each of said clutches, and hydraulic actuating means interposed between each of said control members and the clutch associated therewith, each of said actuating means embodying means enabling manual control of the associated clutch by manipulation of the associated control member upon lack of hydraulic power.

2. In a track-type tractor having drivable endless track mechanism at each side thereof; an engine for driving said endless track mechanisms; a friction steering clutch interposed in the drive to each of said endless track mechanisms to enable steering of said tractor by control thereof; and hydraulic mechanism for controlling said steering clutches independently or together including a manually manipulatable control member independently associated with each of said clutches, hydraulic actuating means interposed between each of said control members and the clutch associated therewith, and common pumping means for said actuating means driven from said engine, each of said actuating means embodying means enabling manual control of the associated clutch by manipulation of the associated control member upon lack of hydraulic power.

3. In a vehicle having drivable traction means; a friction steering clutch interposed in the drive to said traction means and having spring means for effecting engagement of the parts thereof; and hydraulic mechanism for controlling said steering clutch including a manually movable control member, a movable actuating member adapted to be moved by fluid pressure for effecting disengagement of said clutch against the action of said spring means, and a valve member movable to control application of fluid pressure on said actuating member and connected to said manually movable member so as to be moved thereby, said valve member and said actuating member having cooperating means rendering the extent of movement of said actuating member a function of the extent of movement of said valve member for enabling complete disengagement of said clutch or partial disengagement thereof whereby it may be slipped to render its action substantially the same as that obtainable by hand manipulation, and said valve member being located between said manually movable control member and said actuating member to move said actuating member and thereby enable manual control of said clutch by manipulation of said manually movable control member upon lack of hydraulic power.

4. In a vehicle having drivable traction means at each side thereof; a friction steering clutch interposed in the drive to each of the traction means to enable steering of the vehicle by control thereof; and hydraulic mechanism for controlling the steering clutches independently or together including a manually manipulatable control member independently associated with each of the clutches, and hydraulic actuating means interposed between each of the control members and the clutch associated therewith, each of the actuating means embodying mechanism enabling complete disengagement of the associated clutch or partial disengagement thereof whereby the clutches may be slipped to render their action substantially the same as that obtainable by hand manipulation, and each of the actuating means also embodying mechanism enabling manual control of the associated clutch upon lack of hydraulic power.

5. A vehicle having drivable traction means at each side thereof; an engine for driving the traction means; releasable drive establishing means interposed in the drive to each of the traction means to enable steering of the vehicle by control thereof; and hydraulic mechanism for controlling the drive establishing means comprising a manually manipulatable control lever associated with each of the drive establishing means, and an axially movable connection including a plurality of axially alined parts movable in a straight line path between each of the control levers and the drive establishing means associated therewith enabling manual control of the associated drive establishing means by manipulation of the associated control lever upon lack of hydraulic power.

6. A track-type tractor having drivable endless track mechanism at each side thereof; an engine for driving such endless track mechanisms; a friction steering clutch interposed in the drive to each of the endless track mechanisms to enable steering of the tractor by control thereof; and hydraulic mechanism for controlling the steering clutches independently or together comprising a manually manipulatable control lever independently associated with each of the clutches, and an axially movable connection including a plurality of axially alined parts movable in a straight line path and interposed between each of the control levers and the clutch associated therewith enabling manual control of the associated clutch by manipulation of the associated control lever upon lack of hydraulic power; one of the parts in each of said connections being a piston member adapted to be moved by fluid pressure for effecting disengagement of the associated clutch, and another of the parts being a valve member to control application of fluid pressure on the piston member, said piston member and said valve member in each connection having cooperating means rendering the extent of movement of the piston member a function of the extent of movement of the associated control lever for enabling complete disengagement of the associated clutch or partial disengagement thereof whereby the clutches may be slipped to render their action substantially the same as that obtainable by hand manipulation.

7. In a vehicle having drivable traction means at each side thereof; a friction steering clutch interposed in the drive to each of the traction means to enable steering of the vehicle by control thereof; brake mechanism associated with each of the traction means; and hydraulic mechanism for controlling the steering clutches independent of the control of the brake mechanisms including a plurality of independently manually manipulatable control members, one for each of the clutches, and hydraulic actuating means interposed between each of said control members and the clutch associated therewith, each of the actuating means embodying mechanism enabling complete disengagement of the associated clutch or partial disengagement thereof whereby the clutches may be slipped to render their action substantially the same as that obtainable by hand manipulation, and each of the actuating means also embodying mechanism enabling manual control of the associated clutch upon lack of hydraulic power.

8. In a vehicle having drivable traction means at each side thereof; an engine for driving said traction means; a friction steering clutch interposed in the drive to each of said traction means to enable steering of the vehicle by control thereof; liquid pressure operable hydraulic mechanism for controlling the steering clutches independently or together including a manually manipulatable control member independently associated with each of the clutches, and hydraulic actuating means interposed between each of such control members and the clutch associated therewith, each of the actuating means embodying mechanism enabling complete disengagement of the associated clutch or partial disengagement thereof, and also mechanism enabling manual control of the associated clutch upon lack of hydraulic power; and common pumping means for said actuating means driven from the engine for supplying liquid under pressure to said actuating means.

HARMON S. EBERHARD.
GEORGE W. LEWIS.